(12) United States Patent
Pishehvari et al.

(10) Patent No.: US 12,005,907 B2
(45) Date of Patent: Jun. 11, 2024

(54) METHOD FOR DETERMINING POSITION DATA AND/OR MOTION DATA OF A VEHICLE

(71) Applicant: Aptiv Technologies AG, Schaffhausen (CH)

(72) Inventors: Ahmad Pishehvari, Wuppertal (DE); Uri Iurgel, Wuppertal (DE); Markus Stefer, Remscheid (DE)

(73) Assignee: Aptiv Technologies AG, Schaffhausen (CH)

( * ) Notice: Subject to any disclaimer, the term of this patent is extended or adjusted under 35 U.S.C. 154(b) by 214 days.

(21) Appl. No.: 17/141,010

(22) Filed: Jan. 4, 2021

(65) Prior Publication Data

US 2021/0213962 A1 Jul. 15, 2021

(30) Foreign Application Priority Data

Jan. 14, 2020 (EP) .................................... 20151644

(51) Int. Cl.
*B60W 40/105* (2012.01)
*G01C 21/32* (2006.01)

(52) U.S. Cl.
CPC ........... *B60W 40/105* (2013.01); *G01C 21/32* (2013.01); *B60W 2420/408* (2024.01);
(Continued)

(58) Field of Classification Search
CPC .. B60W 40/10; B60W 40/105; B60W 40/114; B60W 2420/52; B60W 2420/60;
(Continued)

(56) References Cited

U.S. PATENT DOCUMENTS 8,558,733 B2 10/2013 Kamo et al.
8,633,849 B2 1/2014 Shibata et al.
(Continued)

FOREIGN PATENT DOCUMENTS

CN 111366164 7/2020
DE 10148062 4/2003
(Continued)

OTHER PUBLICATIONS

"Extended European Search Report", EP Application No. 18153439.7, Sep. 12, 2018, 14 pages.
(Continued)

*Primary Examiner* — Adam D Tissot
*Assistant Examiner* — Aaron K McCullers
(74) *Attorney, Agent, or Firm* — Harness, Dickey & Pierce, P.L.C.

(57) ABSTRACT

A computer-implemented method for determining a position of a vehicle is disclosed, wherein the vehicle is equipped with a sensor for capturing scans of a vicinity of the vehicle, wherein the method comprises at least the following steps carried out by computer-hardware components: capturing at least one scan by means of the sensor with a plurality of sensor data samples given in a sensor data representation; determining, from a database, a predefined map with at least one element is given in a map data representation; determining a transformed map by transforming the at least one element of the predefined map from the map data representation into the sensor data representation; matching at least a subset of the sensor data samples of the at least one scan and the at least one element of the transformed map; and determining the position of the vehicle based on the matching.

21 Claims, 7 Drawing Sheets

(52) U.S. Cl.
CPC ..... *B60W 2520/10* (2013.01); *B60W 2520/14* (2013.01); *B60W 2556/40* (2020.02)

(58) Field of Classification Search
CPC ......... B60W 2520/10; B60W 2520/14; B60W 2556/30; B60W 2556/40; G01C 21/32; G01S 11/10; G01S 13/02; G01S 13/66; G01S 13/86; G01S 13/865; G01S 13/89; G01S 17/06; G01S 17/42; G01S 17/50; G01S 17/58; G01S 17/86; G01S 17/89
USPC .......................................... 701/300; 342/146
See application file for complete search history.

(56) References Cited

U.S. PATENT DOCUMENTS

| | | | |
|---|---|---|---|
| 9,041,588 | B2 | 5/2015 | Yasugi et al. |
| 9,199,643 | B1 | 12/2015 | Zeng |
| 9,618,608 | B2 | 4/2017 | Mizutani et al. |
| 2005/0259002 | A1 | 11/2005 | Erario et al. |
| 2014/0043185 | A1 | 2/2014 | Quellec et al. |
| 2015/0022392 | A1 | 1/2015 | Hegemann et al. |
| 2016/0139255 | A1 | 5/2016 | Bueschenfeld et al. |
| 2016/0154408 | A1* | 6/2016 | Eade ................. G05D 1/0246 701/523 |
| 2016/0171898 | A1* | 6/2016 | Silver .................. G01S 13/933 701/3 |
| 2018/0067491 | A1* | 3/2018 | Oder ................. G01C 21/3415 |
| 2019/0005719 | A1* | 1/2019 | Fleischman ............... G06T 7/75 |
| 2019/0129026 | A1* | 5/2019 | Sumi ................... G01S 15/8915 |
| 2019/0180467 | A1* | 6/2019 | Li ........................ G06V 10/255 |
| 2019/0227145 | A1 | 7/2019 | Pishehvari et al. |
| 2019/0294181 | A1* | 9/2019 | Ohno ................. G05D 1/0238 |
| 2019/0302757 | A1* | 10/2019 | Sato ..................... G05D 1/0044 |
| 2020/0217943 | A1 | 7/2020 | Pishehvari et al. |
| 2021/0141091 | A1 | 5/2021 | Pishehvari et al. |
| 2021/0164800 | A1 | 6/2021 | Lessmann et al. |
| 2021/0396862 | A9 | 12/2021 | Pishehvari et al. |

FOREIGN PATENT DOCUMENTS

| | | |
|---|---|---|
| DE | 102016205227 | 10/2017 |
| DE | 102016214030 | 2/2018 |
| EP | 1584520 | 10/2005 |
| EP | 3517996 | 7/2019 |
| WO | 2011023244 | 3/2011 |

OTHER PUBLICATIONS

"Foreign Office Action", EP Application No. 1853439.7, Jul. 14, 2020, 5 pages.
"Foreign Office Action", EP Application No. 18153439.7, Dec. 4, 2020, 5 pages.
Kirchner, et al., "Der Laserscanner ALS Intelligenter KZF-Sensor", Jan. 1, 1998, pp. 26-32.
Pishehvari, et al., "Ego-pose estimation via Radar and Openstreetmap-based Scan matching", May 2018, 8 pages.
Streller, et al., "Object Tracking in Traffic Scenes with Multi-Hypothesis Approach Using Laser Range Images", Sep. 30, 2001, 8 pages.
"Non-Final Office Action", U.S. Appl. No. 16/241,404, filed Nov. 17, 2021, 23 pages.
"Extended European Search Report", EP Application No. 19207813.7, May 29, 2020, 15 pages.
"Extended European Search Report", EP Application No. 20151644.0, May 29, 2020, 15 pages.
"Extended European Search Report", European Application No. 19212492.3, Jun. 2, 2020, 14 pages.
Besl, et al., "A Method for Registration of 3-D Shapes", Feb. 1992, pp. 239-255, 18 pages.
Biber, "The Normal Distributions Transform: A New Approach to Laser Scan Matching", Nov. 2003, 6 pages.
Borenstein, et al., "Correction of Systematic Odometry Errors in Mobile Robots", Aug. 1995, pp. 569-574, 6 pages.
Bosse, et al., "Histogram Matching and Global Initialization for Laser-only SLAM in Large Unstructured Environments", Apr. 2007, pp. 4820-4826, 7 pages.
Burnikel, et al., "How to Compute the Voronoi Diagram of Line Segments: Theoretical and Experimental Results", Max Planck Institute for Informatics, DOI: 10.1007/BFb0049411, Apr. 2006, 14 pages.
Censi, "An ICP Variant Using a Point-to-line Metric", Jun. 2008, 7 pages.
Censi, et al., "Scan Matching in the Hough Domain", Jan. 2005, 6 pages.
Checchin, et al., "Radar Scan Matching SLAM using the Fourier-Mellin Transform", Jan. 2009, 10 pages.
Cole, et al., "Using Laser Range Data for 3D Slam in Outdoor Environments", Jun. 2006, 9 pages.
Diosi, et al., "Laser Scan Matching in Polar Coordinates with Application to SLAM", Sep. 2005, 6 pages.
Haklay, et al., "OpenStreetMap: User-Generated Street Maps", Oct. 2008, pp. 12-18, 7 pages.
Levinson, et al., "Robust Vehicle Localization in Urban Environments Using Probabilistic Maps", Jun. 2010, 7 pages.
Lingermann, et al., "Indoor and Outdoor Localization for Fast Mobile Robots", Jan. 2004, 6 pages.
Lu, "Robot Pose Estimation in Unknown Environments by Matching 2D Range Scans", Nov. 1997, pp. 249-275, 27 pages.
Minguez, et al., "Metric-Based Iterative Closest Point Scan Matching for Sensor Displacement Estimation", Nov. 2006, 7 pages.
Nister, et al., "Visual Odometry", Jul. 2004, 8 pages.
Pishehvari, et al., "Robust Range-Doppler Registration with HD Maps", Apr. 2020, 9 pages.
Schwertfeger, et al., "Map Evaluation Using Matched Topology Graphs", Sep. 2015, 27 pages.

* cited by examiner

METHOD FOR DETERMINING POSITION DATA AND/OR MOTION DATA OF A VEHICLE

CROSS-REFERENCE TO RELATED APPLICATIONS

This application claims priority to European Patent Application Number 20151644.0, filed Jan. 14, 2020, the disclosure of which is hereby incorporated by reference in its entirety herein.

TECHNICAL FIELD

The present disclosure relates to a computer-implemented method for determining a position data and/or motion data of a vehicle.

BACKGROUND

Vehicles known from the art are capable of determining their current position on the basis of at least one sensor mounted on the vehicle. For example, many vehicles comprise a global-positioning system (GPS) from which the position of the vehicle can be inferred with a fair degree of accuracy. The determination of the position by means of a GPS requires a radio signal from the satellite space, which is, however, not always readily available. For example, the required GPS-signal can be very weak so that a relatively long-time span is necessary in order to evaluate the position from the signal. Sometimes, the signal is too weak in order to determine the position with the required degree of accuracy. In other circumstances, there is even no signal available, for example, in fully or partially enclosed vicinities, such as road tunnels and buildings, in particular subterranean garages. Therefore, determining position data of a vehicle is difficult. As another problem, the accuracy of GPS is sometimes not sufficient, for example for autonomous-driving applications. Similar problems occur with vehicle motion data. Although one or more motion sensors are usually installed in every vehicle the measured motion data often has a low accuracy, which can be insufficient for autonomous-driving applications.

Modern vehicles, for example upper-class cars, are equipped with radar and/or LiDAR (light detection and ranging) systems. Corresponding measurements, i.e. scans, alone can be insufficient for determining the position with a desired reliability and accuracy. Similar problems occur with one or more motion sensors mounted on the vehicle. In particular, various measurement methods, e.g., odometry (dead reckoning) are alone not suitable for determining the position with the desired reliability. Additionally, using radar sensors or comparable sensor technology can require significant processing resources, particularly for determining radar detection points from the raw sensor data. The raw sensor data is usually given as sensor data samples with a radial distance component and a rate of change of the distance (velocity in the radial distance direction). Such sensor data can be denoted as Doppler-sensor data or range-Doppler data delivered by a Doppler sensor. It is understood that this raw data can be determined from even more basic raw data ("raw raw data"), for example time-domain data captured by the Doppler sensor.

SUMMARY

The present disclosure provides a computer-implemented method, a computer system and a non-transitory computer readable medium according to the independent claims. Embodiments are given in the subclaims, the description and the drawings.

In one aspect, the present disclosure is directed at a computer-implemented method for determining position data and/or motion data of a vehicle, wherein the vehicle is equipped with at least one sensor for capturing scans of a vicinity of the vehicle, wherein the method comprises at least the following steps carried out by computer-hardware components: capturing at least one scan by means of the at least one sensor, wherein the at least one scan represents the vicinity of the vehicle and comprises a plurality of sensor data samples given in a sensor data representation, wherein the sensor data representation comprises a first component and a second component, the first component representing a distance between the sensor and the vicinity of the vehicle, and the second component representing a rate of change of the distance between the sensor and the vicinity of the vehicle; determining, from a database, a predefined map, wherein the predefined map represents the vicinity of the vehicle and comprises at least one element representing a static landmark, wherein the at least one element is given in a map data representation comprising a plurality of coordinates, wherein the coordinates represent position data of the static landmark; determining a transformed map by transforming the at least one element of the predefined map from the map data representation into the sensor data representation; matching at least a subset of the sensor data samples of the at least one scan and the at least one element of the transformed map, wherein the matching is carried out in dependence on at least one influence parameter for controlling the influence of the plurality of sensor data samples on the matching; determining the position data and/or motion data of the vehicle based on the matching.

It has been found that sensor measurements, for example radar measurements, are in principle well suited for robust measurement of the vicinity of a vehicle. However, determining the position of the vehicle on the basis of radar scans can require significant processing efforts. This is because a radar scan usually comprises a plethora of sensor data samples from which only a portion represent useful measurements, e.g., due to noise. Furthermore, the sensor data samples are not provided in a full spatial representation like a Cartesian coordinate system. In particular, the sensor data samples are given with said first component (distance) and second component (rate of change of distance), which is a partial spatial representation. In order to obtain a full spatial representation, radar detection points (also called point cloud) could be determined from the sensor data samples, which involves processing (e.g., peak finding, angle estimation, transformation from Polar to Cartesian coordinates). The detection points could then be used for matching because map data and detection points would then both be provided in a full spatial representation, e.g. Cartesian coordinates. For example, the detection points can comprise full spatial data relative to the underlying vehicle.

As a different approach it is proposed herein to avoid determining detection points or point clouds with full spatial representation, i.e. with at least two spatial coordinates. It is suggested to directly use the sensor data samples and to perform the matching on the basis of the sensor data samples and the one or more elements of the transformed map. This step is carried out in the sensor data representation. Processing effort is significantly reduced, while the position of the vehicle can still be determined with a high degree of accuracy and reliability.

Having regard to the matching, it is proposed to make use of ground-truth data, which represents the vicinity of the vehicle. This ground-truth data is provided in form of a database, which comprises map data that preferably represents a geo-structural model. The map data describes the vicinity of a desired driving area, which preferably comprises characteristic objects, i.e. static landmarks, which can limit a desired driving area of a vehicle. Examples for such landmarks are traffic signs, poles, streetlamps, walls, fences but also substantial pavement edges and bigger plants, e.g., trees and the like. Although such objects will usually limit a driving area, the map data is not limited thereto. This is to say that the map data can also comprise landmarks, which are not directly relevant for defining an allowable driving space. In principle, the map data can comprise representations of those objects, which are expected to be detected by the sensor in its vicinity.

The map data, which is stored in the database, comprises representations of static landmarks in form of so-called elements. These elements are of mathematical nature and are preferably simplified objects, as will be explained in greater detail below. In particular, each of the elements comprises information about its global position, i.e. in a world coordinate system, which can be a Cartesian coordinate system. In contrast, sensor data samples acquired by means of a sensor, e.g. a Doppler sensor, for example a radar system of a vehicle, preferably only comprise two components, which represent a relative distance between the vicinity and the sensor and the rate of change of the distance (velocity). These components form at least a part of the sensor data representation. In one example, the components represent a relative radial distance between the vicinity and the sensor and the rate of change of the radial distance (radial velocity).

The map data in the database can comprise map data, which captures a desired driving area, for example all valid driving areas in a given country or a group of different countries. A predefined map is determined from the map data, wherein the predefined map can be limited to a current vicinity of the vehicle. The current vicinity can be limited to a specified range of the sensor so that the predefined map includes only those elements within the range of the sensor, i.e., those objects, which are potentially hit by the sensor signals emitted from the sensor. Therefore, the step of determining the predefined map comprises identifying a portion of the map, which corresponds to a current "view" of the sensor or at least overlaps with the current view, thereby providing a geo-structural description of the local vicinity of the vehicle, e.g. at a given point in time. The predefined map can be determined on the basis of position data, which is derived from a current GPS-signal received at the vehicle. If such a signal is currently not available the last GPS-signal or another position estimate may be used, in particular from one or more motion sensors of the vehicle. It is understood that the validity of the predefined map as ground truth depends on the validity of the position information that is used for determining the predefined map. If a position estimate from one or more motion sensors of the vehicle is used (odometry), the predefined map can be regarded as an inaccurate estimation, wherein the sensor data samples are regarded as ground truth. The matching can then be used to find an improved position data estimate and also an improved motion data estimate.

Each of the plurality of elements of the predefined map represents a static landmark in the vicinity of the vehicle. The predefined map can be a navigation map, in particular a navigation map from a publicly available database, e.g. open-street map. The predefined map can be derived from a global database on the basis of a given position of the vehicle, e.g. from a global position system of the vehicle or by using odometry, as indicated above. The static landmarks can be static objects, e.g. poles, walls of buildings or other barriers for the vehicle which form objects detectable by the sensor system of the vehicle. The map can be a so called High-Definition (HD) map in which the elements form highly precise position information.

The predefined map, i.e. the at least one element thereof, is matched with at least a subset of the plurality of sensor data samples. The plurality of sensor data samples are determined in of one or more scans, wherein in the latter case, the scans are preferably successive scans. Preferably, the sensor data samples correspond to a substantially common time point in time, which may also be a short time span.

The term "matching" can be understood in the sense of determining (or maximizing) a correspondence between the sensor data samples and the one or more elements. In principle, since each transformed element has an uncertainty with respect to the true characteristics, the sensor data samples can be used to find a location with an increased certainty (i.e., the sensor data samples are used to reduce the uncertainty with respect to transformed elements). In particular, the matching can be a registration process, for example an image registration.

The matching is carried out in dependence on at least one influence parameter for controlling the influence of the plurality of sensor data samples on the matching. This leads to a more precise matching result, as undesired effects like noise or uncertainty of the sensor data samples or the transformed map are reduced by controlling the influence of the sensor data samples on the matching.

The position data and/or motion data of the vehicle is determined on the basis of the matching. This is to say that the correspondence between the sensor data samples and the transformed elements is exploited for determining at least one parameter which represents the position and/or motion of the vehicle. In general, the position can be determined from any appropriate sensor measurement or a combination thereof. The combination proposed here, namely sensor data samples and transformed elements, can be sufficient to determine the position and/or the motion. The matching also allows determining improved position and/or motion data on the basis of preliminary position and/or motion data. In addition to the sensor data samples and the elements of the predefined map, further sensor measurements can be used for determining the position, e.g., from one or more additional sensors of the vehicle.

Preferably, the position of the vehicle comprises coordinates, which represent a location of the vehicle with respect to a coordinate system. Furthermore, the position can comprise an angle of the vehicle. The angle preferably represents a heading, e.g. an orientation or angle of the vehicle with respect to the used coordinate system.

Embodiments are described in the dependent claims, the description and the drawings.

According to an embodiment, the at least one influence parameter comprises at least a first influence parameter representing motion of the vehicle. In one example, the first influence parameter represents motion related to the operating velocity of the vehicle. The degree of motion of the vehicle can have a high influence on the uncertainty of the transformed elements, as well as preliminary position and/or motion data used for the method. For example, preliminary motion data can be obtained using one or motion sensors of the vehicle. The motion data can then be used for determining the transformed map. In this way, an uncertainty of the preliminary motion data, which may increase with the degree of motion, propagates into the matching step. Therefore, controlling the influence of sensor data samples on the matching on the basis of the motion allows increasing the accuracy on the matching. In particular, it can be ensured that the matching is still accurate when the mismatch between sensor data samples and the elements of the transformed map is large when the velocity of the vehicle has a critical impact on the result, for example when the yaw rate of the vehicle is large.

According to an embodiment, the at least one influence parameter comprises a first motion parameter of the vehicle and/or a second motion parameter of the vehicle, wherein the first motion parameter represents a velocity of the vehicle and wherein the second motion parameter represents a yaw rate of the vehicle. Consideration of both, velocity and yaw rate, brings substantial benefits in raising the accuracy of the method. In general, the velocity can represent the number of revolutions per second of a wheel of the vehicle. The yaw rate can generally be measured by using a yaw rate sensor (e.g. gyroscope) of the vehicle. The first influence parameter can comprise or be formed by the first and second motion parameters.

According to an embodiment, the influence of the sensor data samples on the matching is controlled by determining the subset of the sensor data samples for matching in dependence of the influence parameter, in particular the first influence parameter. This allows to reliably identify sensor data samples for which a corresponding element exists.

According to an embodiment, the method comprises determining the subset of the sensor data samples for the matching, wherein the following steps are carried out by the computer-hardware components for at least some of the sensor data samples: identifying, from the plurality of sensor data samples, a sensor data sample by using an identification rule, wherein identifying the sensor data sample is carried out in dependence of the influence parameter, in particular first influence parameter; and assigning the identified sensor data sample to the at least one element of the transformed map. In this way, the subset can be readily determined by using a rule, which is preferably predefined. Additionally, each identified sensor data sample, which thus forms part of the subset is also assigned to an element of the map. The sensor data sample and the assigned element form a pair, which are matched to each other in the matching step. It is understood that each identified data sample of the subset can be assigned to a different element of the map. As a result, every element of the element can be associated with a sensor data sample. However, it is possible that an element is not associated with a sensor data sample, namely if no sensor data sample is identified for the element.

As noted, determining the subset of sensor data samples can be carried out by using an identification rule. The identification rule can generally be configured to identify the most similar sensor data sample for a respective element of the map. For example, the identified sensor data sample can have the most similar components with respect to one of the transformed elements. The identification rule can be implemented as a machine-learning model, for example as an artificial neural network.

As also noted above, identifying the sensor data sample is carried out in dependence of the influence parameter. The effects of vehicle motion on the accuracy of the sample identification can be compensated so that the process remains reliable during complex driving maneuvers or high dynamic motion.

According to an embodiment, identifying the sensor data sample comprises: determining one or more candidate sensor data samples from the plurality of sensor data samples, wherein each of the candidate sensor data samples is located in a neighborhood of the at least one element of the transformed map, the neighborhood being defined with respect to the first component and the second component of the sensor data representation, wherein the size of the neighborhood is defined in dependence on the influence parameter, in particular first influence parameter; determining, for each candidate sensor data sample, a difference between the candidate sensor data sample and the at least one element of the transformed map; and selecting, from the candidate sensor data samples, a respective sensor data sample as the identified sensor data sample, the respective sensor data sample satisfying a selection criterion on the basis of the difference between the respective sensor data sample and the at least one element of the transformed map.

Determining the candidate sensor data samples represents a filtering step, wherein a local preselection from the available sensor data samples is carried out. Those sensor data samples, which are located outside the neighborhood and thus considered to be far away from the element in terms of the first and second components are discarded. This avoids implausible pairs of sensor data samples and elements. Potentially erroneous assignments are avoided and the accuracy of the matching is increased. It is assumed that the difference between a sensor data sample and an element should be low.

The neighborhood can be defined by means of simple thresholding, i.e. by one of more thresholds for the first and second components. In particular, a lower and an upper threshold can be defined with respect to the value of the first component of the respective element. Likewise, lower and upper thresholds can be defined for the value of the second component of the respective element. A similar approach for defining the neighborhood for a given element is to define a first range, which is centered around the value of the first component, and a second range can be centered around the value of the second component. If the values for the first and second components of a given sensor data sample are both within the respective ranges, or likewise between the lower and upper thresholds, then the sensor data sample is considered to be located in the neighborhood. The sensor data sample is then classified as a candidate sensor data sample. This approach merely requires low computational effort compared to determining more complex distance measures for each sensor data sample. In one specific example, the size of the neighborhood is defined in dependence on the influence parameter (for example velocity and yaw rate) by determining one or more thresholds for the second component (rate of change of distance). This can be denoted as adaptive thresholding. The size of the neighborhood with regard to the first component (distance) is preferably fixed, for example by one or more fixed thresholds for the first component. The fixed thresholds are not defined in dependence on the influence parameter. This can be denoted as hard thresholding. Alternatively, adaptive thresholding can also be used for the first component.

Selecting a sensor data sample on the basis of the difference to an element represents one type of identification rule. The selected element can be assigned to the at least one element of the map, as noted further above in view of the identification rule. The difference can be determined as a distance measure, for example an Euclidean distance measure. The distance measure represents the distance between the respective sensor data sample and the map element with respect to the first and second components. For example, the distance measure can be equal to the square root of the sum of squares of the distances per component. In more general terms, the distance measure is preferably determined in the sensor data representation, which ensures fast and reliable identification of the sensor data sample. Since the number of candidate sensor data samples is usually much lower than the overall number of sensor data samples, the number of difference calculations is reduced accordingly.

In one example, the selection criterion comprises a definition for selecting the sensor data sample having the minimum difference of all candidate sensor data samples. In particular, the sensor data sample having the minimum distance to the element can be selected and assigned to the element. It is understood that further or other selection criteria can be used.

According to an embodiment, the matching comprises determining a rigid transformation function by minimizing a difference between the at least one element of the transformed map and the assigned sensor data sample, wherein one of the element and the assigned sensor data sample is transformed by means of the rigid transformation function. Preferably, the at least one element of the transformed map is transformed by the rigid transformation function, i.e. the element is matched to the respective data sample. It is understood that determining the rigid transformation function can comprise minimizing a cost function of a plurality of differences, each of the differences being associated with a difference between one element of the transformed map and a sensor data sample being assigned to the element and transformed by means of the rigid transformation function. In this way, the rigid transformation function is optimized so that the sensor data samples have the best fit or overlap with the elements of the transformed map. Minimizing the one or more differences preferably comprises minimizing a cost function, which in one example is a sum of the one or more differences.

According to an embodiment, the rigid transformation function is determined in dependence on at least one parameter representing motion of the vehicle, in particular velocity and yaw rate. In addition, the rigid transformation function is determined in dependence on at least one parameter representing the position of the vehicle, in particular x-coordinate, y-coordinate, and angle (heading). Five parameters may be used. The one or more parameters can form optimization parameters for the rigid transformation function. Minimizing the difference is affected by motion of the vehicle and, e.g., the uncertainty caused by the motion of the vehicle can correctly be taken into account. The accuracy of the matching is improved.

According to an embodiment, the influence of the sensor data samples on the matching is controlled by determining the transformed map in dependence of the influence parameter, in particular first influence parameter.

According to an embodiment, the difference between the at least one element of the transformed map and the assigned sensor data sample is calculated by evaluating the differences of the first and/or second components between the element of the transformed map and the assigned sensor data sample, respectively. The matching is significantly faster thanks to computation in the sensor data representation.

According to an embodiment, the at least one influence parameter comprises a second influence parameter. The second influence parameter is based on the distance between the sensor and the vicinity of the vehicle, in particular the first component of the sensor data samples. The distance between the sensor and the vicinity of the vehicle can affect the certainty of a sensor data sample. For example, if the distance or the value of the first component of a given sensor data sample is larger than the distance of another sensor data sample, the given sensor data sample is likely to have a higher expected error than the other sensor data sample. This aspect can be caused by a decreasing sensor accuracy for longer measurement distances. Thus, in order to increase the accuracy of the matching, the distance can be taken into account by means of the second influence parameter.

According to an embodiment, the influence of the sensor data sample on the matching is controlled by weighting sensor data samples with the second influence parameter. For example, sensor data samples with a small distance component (i.e. small value of the first component) can be emphasized in the matching through a relatively high weight. The influence of sensor data samples with a larger distance component is preferably reduced.

A weighting function can be used for weighting the sensor data samples in dependence of their distance component, respectively. For example, let r be the distance component, e.g. the first component of the sensor data representation. The second influence parameter can be given by $1/r$ or $1/r^2$. It is also possible to normalize the distance component to a value of one, e.g. by division of r by the maximum of all r, $r_{max}$. A linear weighting can then be used for example by $1-r_{nrm}$, with $r_{nrm}$ being the normalized distance component. An exponential weighting is another option, e.g. $\exp(-k*(r-r_{max})/r_{max})$ with k being a tuning parameter. As an alternative or in addition to these weighting examples it is also possible to exclude sensor data samples from the matching if their distance component is beyond a threshold. More generally, the sensor data samples can be filtered in dependence of their distance component.

According to an embodiment, the at least one influence parameter comprises a third influence parameter based on a signal strength indicator for the sensor data samples. The signal strength can be a relative signal strength. For example, the signal strength for a given sensor data sample can represent the signal energy received for this sensor data sample relative to the emitted signal energy. In another example, the signal strength represents a signal-to-noise ratio (SNR) for the given sensor data sample. The signal strength can be provided by the sensor, which is used for determining the sensor data samples, for example a radar sensor system.

According to an embodiment, the influence of the sensor data samples on the matching is controlled by excluding sensor data samples from the matching on the basis of the third influence parameter. A threshold condition can be applied, which needs to be satisfied for excluding a sensor data sample. In one example, this can be done by excluding sensor data samples for which the third influence parameter is below a predefined threshold. In particular, if the signal strength for a given sensor data sample is below the threshold the sensor data sample will not be used for the matching. The accuracy of the matching is enhanced since sensor data samples with a high uncertainty are not influencing the result in a possibly negative way.

Further aspects and embodiments are described in the following.

According to an embodiment, the method can be implemented in a vehicle in order to provide one or more autonomous-driving applications requiring accurate information about a current position of the vehicle. This is to say that the driving behavior of the vehicle (i.e. "the vehicle") is controlled or modified with respect to the determined position of the vehicle.

According to an embodiment the sensor data representation is a native data representation of the sensor and/or wherein the plurality of sensor data samples form raw sensor data of the sensor. Processing overhead for determining data, which is derived from the raw data, such as radar detection points, can thus be avoided.

According to an embodiment the first component represents a radial distance between the sensor and the vicinity of the vehicle, and wherein the second component represents a rate of change, in particular velocity, of the radial distance between the sensor and the vicinity of the vehicle (radial velocity), wherein the sensor data representation preferably does not comprise a component representing an angle information. The first and second component can be directly obtained per sensor data sample when using a radar system for example. An angle, which is usually part of any radar detection point, does not need to be evaluated and the corresponding processing overhead can be saved. In this regard, it is sufficient to use a single antenna for the sensor, for example a single receiver-transmitter or single receiver-emitter antenna.

According to an embodiment the sensor comprises a Doppler sensor, in particular a radar sensor and/or a LiDAR (light detection and ranging) sensor. As another alternative, a vision sensor, for example a camera can be used for obtaining sensor data samples in the sensor data representation. The term Doppler sensor indicates that it the sensor is configured to obtain sensor data samples directly in the sensor data representation. Determining the sensor data samples can nevertheless require some data processing, but it is deemed to be much less than for determining proper detection points with a full spatial representation in two dimensions. For example, processing an emitted radar signal and a received radar signal in order to determine the distance and the rate of change of the distance is much less complex than determining angle information from the sensor data of a radar sensor. Extracting detection points from range-Doppler data using several antennas can be avoided.

According to an embodiment the sensor, in particular when being configured as a radar sensor, comprises only a single antenna, in particular a single receiver antenna, further in particular a single transmitter-receiver antenna. This is in contrast to usual radar or other Doppler sensors comprising multiple antennas (antenna array) in order to allow angle information to be determined from the corresponding sensor data. However, since angle information is preferably not determined in the method described herein, a single antenna sensor is sufficient and hardware costs of the sensor can be significantly reduced.

According to an embodiment transforming the at least one element comprises using a predefined transformation rule, the transformation rule being adapted to receive the at least one element of the predefined map and velocity information of the sensor and/or the vehicle and to output the at least one element of the transformed map in the sensor data representation in response. Additionally, the predefined transformation rule can receive an initial estimate of the position of the vehicle, for example based on motion sensors of the vehicle (odometry) or GPS.

According to an embodiment the plurality of coordinates of the map data representation are associated with a Cartesian coordinate system or a Polar coordinate system. Other spatial coordinate systems can also be adopted.

According to an embodiment the at least one element represents a pole object, in particular stationary road equipment, for example a streetlamp pole or a traffic sign pole. Good results can be achieved with pole objects labelled as single scatterers. However, other types are also possible.

According to an embodiment the method further comprises determining a subset of the sensor data samples on the basis of the at least one element of the transformed map. In this way, the amount of data is significantly reduced to a portion, which is likely to correlate with the elements of the map.

According to an embodiment determining the subset of the sensor data samples is carried out by using a predefined classification rule, in particular a machine-learning based classification rule, for example on the basis of an artificial neural network. Additionally or alternatively, signal processing approaches like filtering of the sensor data samples can be used to determine the subset.

According to an embodiment the method further comprises determining preliminary position data of the vehicle, and wherein determining the position data of the vehicle comprises transforming the preliminary position data by means of the rigid transformation function.

According to an embodiment the method further comprises determining the position data, in particular the preliminary position, on the basis of a motion model of the vehicle, wherein the motion model is determined on the basis of at least one measurement from at least one motion sensor of the vehicle and/or on the basis of at least some of the plurality of data samples of the at least one scan. The motion model can be a model which describes the trajectory of the vehicle over time. The model can be initialized with some value and is then periodically updated based on motion data measurements of the vehicle. In this regard, the motion model is preferably determined on the basis of at least one measurement from at least one motion sensor of the vehicle and/or on the basis of at least some of the sensor data samples. The combination of measurements from a motion sensor and a radar system or another Doppler sensor can further enhance the accuracy of the method. As an alternative to using a motion model a suitable localization system can be used, for example on the basis of a DGPS (Differential Global Positioning System).

The measurement from the at least one motion sensor can comprise a velocity and/or a yaw rate of the vehicle, wherein the vehicle preferably comprises corresponding sensor facilities. This is also known as "dead-reckoning" measurements. Preferably, the velocity and/or the yaw rate of the vehicle (motion data) is determined on the basis of wheel-speed-sensor (wheel rotation per time span) measurements and/or yaw-rate-sensor measurements. Dead-reckoning measurements taken alone have been found to provide inaccurate estimations of the vehicle position under certain conditions, e.g., during strong steering maneuvers. For this reason, the estimation based on dead-reckoning can represent a preliminary estimation of the vehicle's position.

The position data of the vehicle can comprise coordinates representing a location and/or an orientation of the vehicle.

In another aspect, the present disclosure is directed at a computer system, said computer system being configured to carry out several or all steps of the computer implemented method described herein. The computer system can be connected or connectable to a sensor or sensor system of a vehicle, wherein the sensor or sensor system can be configured to perform at least the method step of capturing the at least one scan with the sensor data samples given in the sensor data representation. The sensor can be part of a sensor unit, which can be a radar sensor unit or a LiDAR sensor unit.

The computer system can be configured to perform other method steps disclosed herein, in particular determining the predefined map, transforming the map, matching, and/or determining the position. Related method steps can also be performed by the computer system. The computer system can also be connected or connectable to motion sensors of the vehicle or to a localization system in order to determine a preliminary position of the vehicle, for example by using a motion model of the vehicle. The computer system can be formed or can be part of a computing unit or system of the vehicle, for example an electronic control unit (ECU) of the vehicle.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a vehicle equipped with a sensor system being adapted to receive electromagnetic radiation emitted from at least one emitter of the sensor system and reflected in a vicinity of the vehicle towards the sensor system. Additionally, a computer system is provided for determining position data and/or motion data of the vehicle on the basis of the emitted and the reflected radiation. The computer system is preferably configured to carry out the computer-implemented method of at least one of the embodiments described herein. The computer system can be located in the vehicle and connected to the sensor system. Alternatively, the computer system can be remote from the vehicle but connected to the vehicle and the sensor system via a wireless connection.

In another aspect, the present disclosure is directed at a non-transitory computer readable medium comprising instructions for carrying out several or all steps or aspects of the computer-implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer-implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Given the above Background, there is a need to provide an improved method for determining position and/or motion data of a vehicle.

Figure 1:
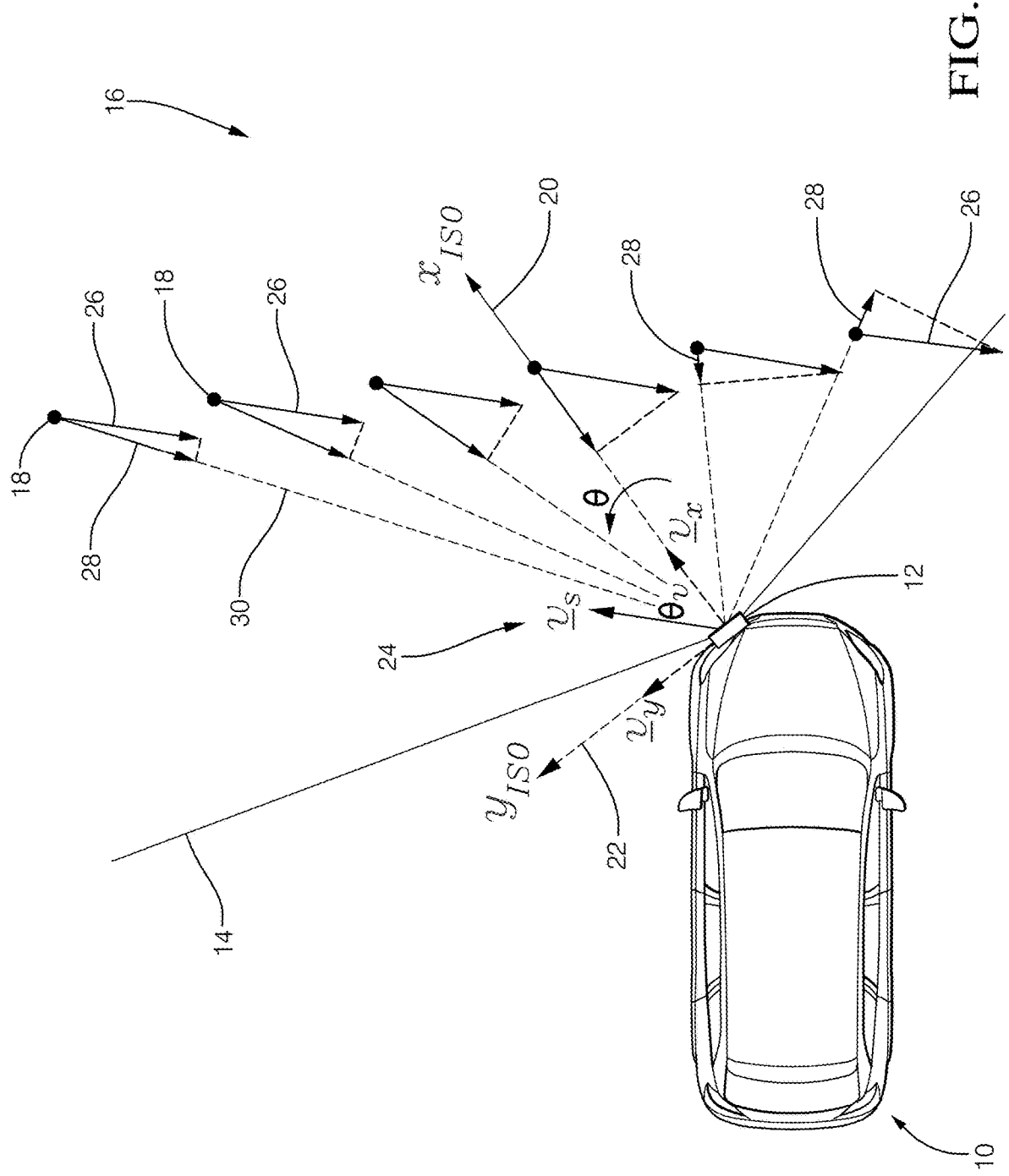
FIG. 1 a vehicle equipped with a sensor for determining scans of the vicinity of the vehicle.

In the figures, the same reference numerals are used for corresponding parts. FIG. 1 depicts a vehicle 10, wherein a Doppler sensor 12 is mounted at the left side of the front bumper of the vehicle 10. The Doppler sensor 12 is configured as a radar sensor with a field of view indicated by reference numeral 14. The sensor 12 is configured to determine scans of the vicinity 16, wherein a plurality of poles 18 are located in the vicinity 16. The sensor 12 has a range, which is suitable to detect each of the poles 18 within the field of view 14, as will be explained in more detail.

The sensor 12 moves with a sensor velocity 24 ($v_s$), which is due to a movement of the vehicle 10 at which the sensor 12 is mounted. In contrast, the poles 18 are all stationary and represent for example stationary road equipment objects such as poles of traffic lights or the like, which are examples of static landmarks. The sensor velocity 24 can be described with respect to an x-coordinate dimension 20 ($x_{ISO}$) and a y-coordinate dimension 22 ($y_{ISO}$), which form a coordinate system of the sensor 12, as indicated in FIG. 1. The sensor velocity 24 can be split up into portions $v_x$ and $v_y$ of the dimensions 20 and 22. Due to the movement of the sensor 12 with the sensor velocity 24 the poles 18 can be considered to move with an inverse sensor velocity 26, which is indicated as corresponding vector arrows originating from the poles 18, cf. FIG. 1. This interpretation results if one assumes that the sensor 12 is stationary, i.e. the relative movement between the sensor 12 and the poles 18 is assigned to the poles 18 rather than to the sensor 12.

The sensor 12 is configured to determine sensor data samples, wherein each of the sensor data samples has a first component and a second component. These components are illustrated in FIG. 1 for each of the poles 18, which are considered to produce a corresponding sensor data sample for each of the poles 18. The first component is radial distance 30 and the second component is radial velocity 28, which is the rate of change of the distance 30. As shown in FIG. 1 the radial distance 30 corresponds to the minimum distance between the sensor 12 (the origin of the sensor coordinate system or another reference point of the sensor) and a respective pole 18, wherein the distance 30 is indicated as dashed line. The radial velocity 28 is indicated in FIG. 1 as an arrow extending from the pole 18 towards the radial direction between the sensor 12 and the pole 18 (dashed line 30). The length of the arrow indicates the magnitude of the velocity 28. It is understood from FIG. 1 that as the angle between the radial direction (between the sensor 12 and the pole 18 (dashed line 30)) and the sensor-velocity vector 24 increases the difference between the radial velocity 28 and the inverse sensor velocity 26 increases. This makes clear that radial velocity 28 is a measured velocity from the perspective of the sensor 12 and it can happen that the radial velocity 28 is close to zero despite a significant sensor velocity 24. It is understood that the scan comprises many more sensor data samples from the vicinity 16, wherein not each sensor data sample represents a pole as indicated in FIG. 1. This means that the scan can comprise data samples, which represent background characteristics of the vicinity 16.

The poles 18 from FIG. 1 are represented by elements of a predefined map of the vicinity 16 (not explicitly shown). The elements form a-priori information and are given in a map data representation, which is based on a Cartesian coordinate system, for example with a x-coordinate dimension and a y-coordinate dimension in orthogonal relation to each other, which may be denoted as a world or map coordinate system 23, see FIG. 2. In order to make use of the elements of the predefined map the elements are transformed from the map data representation to the sensor data representation. As indicated above, the sensor data representation comprises two components representing radial distance 30 and radial velocity 28. In contrast, the map data representation has spatial coordinate dimensions, in particular Cartesian coordinate dimensions. The elements are transformed on the basis of a current estimated vehicle position and motion information of the vehicle 10. This is done by using a predefined transformation rule, which is further illustrated in FIG. 2. As can be seen a coordinate system with an x-coordinate dimension 20A and a y-coordinate dimension 22A is placed with its origin in the middle of the rear axis of the vehicle 10. The position of the vehicle 10 is assumed to be known with respect to the world or map coordinate system 23, which is the same spatial domain as for the elements of the predefined map. By means of one or more motion sensors (not shown) of the vehicle 10, the vehicle velocity v and the yaw rate ω are measured with respect to the vehicle coordinate system defined by the dimensions 20A, 22A, cf. FIG. 2. Furthermore, the x-coordinate $l_x$ and the y-coordinate $l_y$ of the position of the sensor 12 with respect to the dimensions 20A and 22A are known. Additionally, the mounting angle $\varphi_s$ is known. With this information each of the elements of the predefined map can be readily transformed into the sensor data representation. In this way, transformed elements are described by means of the radial distance 30 and a radial velocity 28, as indicated in FIG. 1. The transformed elements can now be processed together with the actual sensor data, i.e. the sensor data samples, wherein the transformed elements and the actual sensor data are both given in the sensor data representation. In this way, a complex processing of the sensor data samples is avoided.

Figure 2:
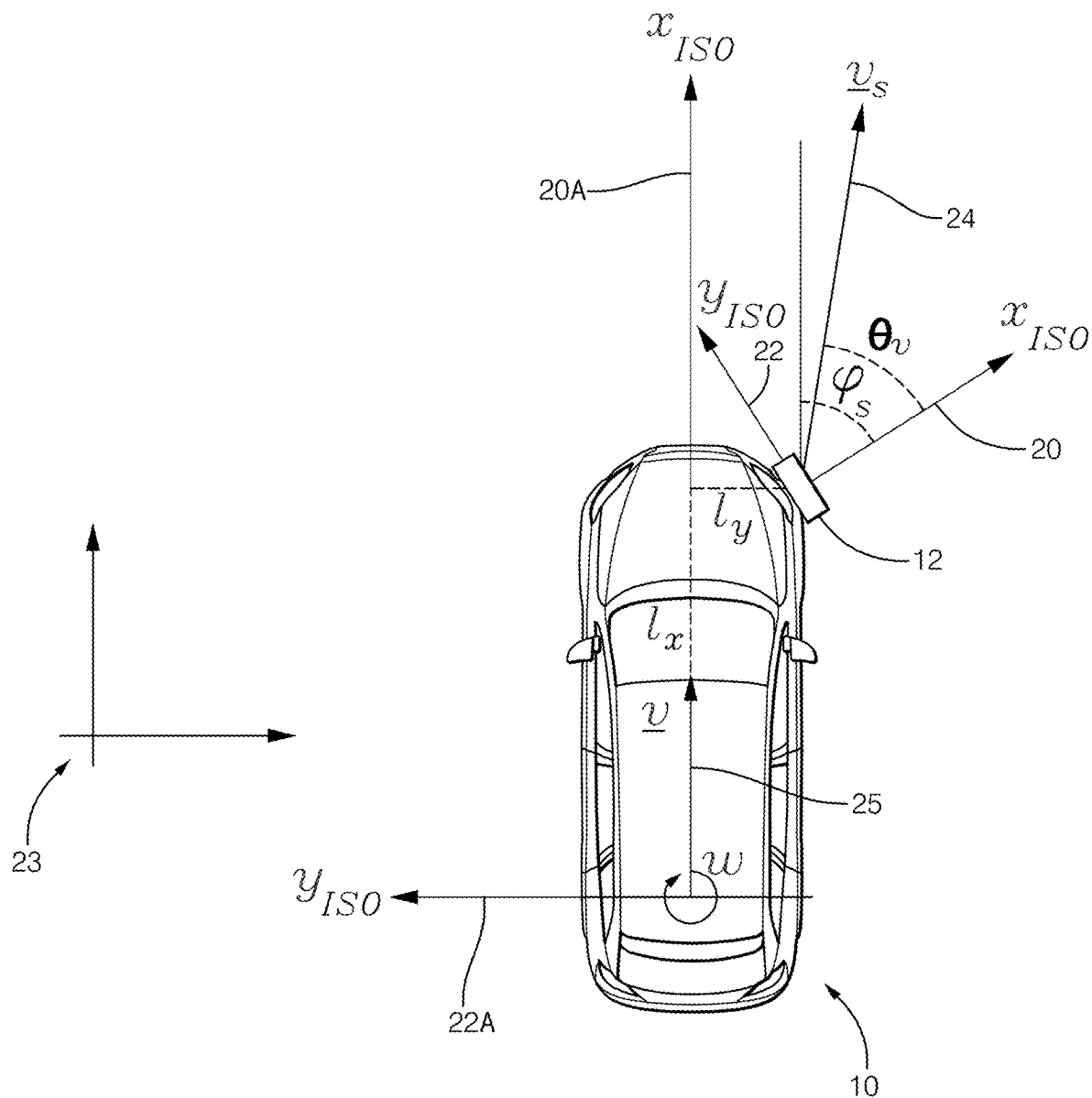
FIG. 2 the vehicle from FIG. 1 illustrating aspects of transforming elements of a map to a sensor data representation.
Figure 3:
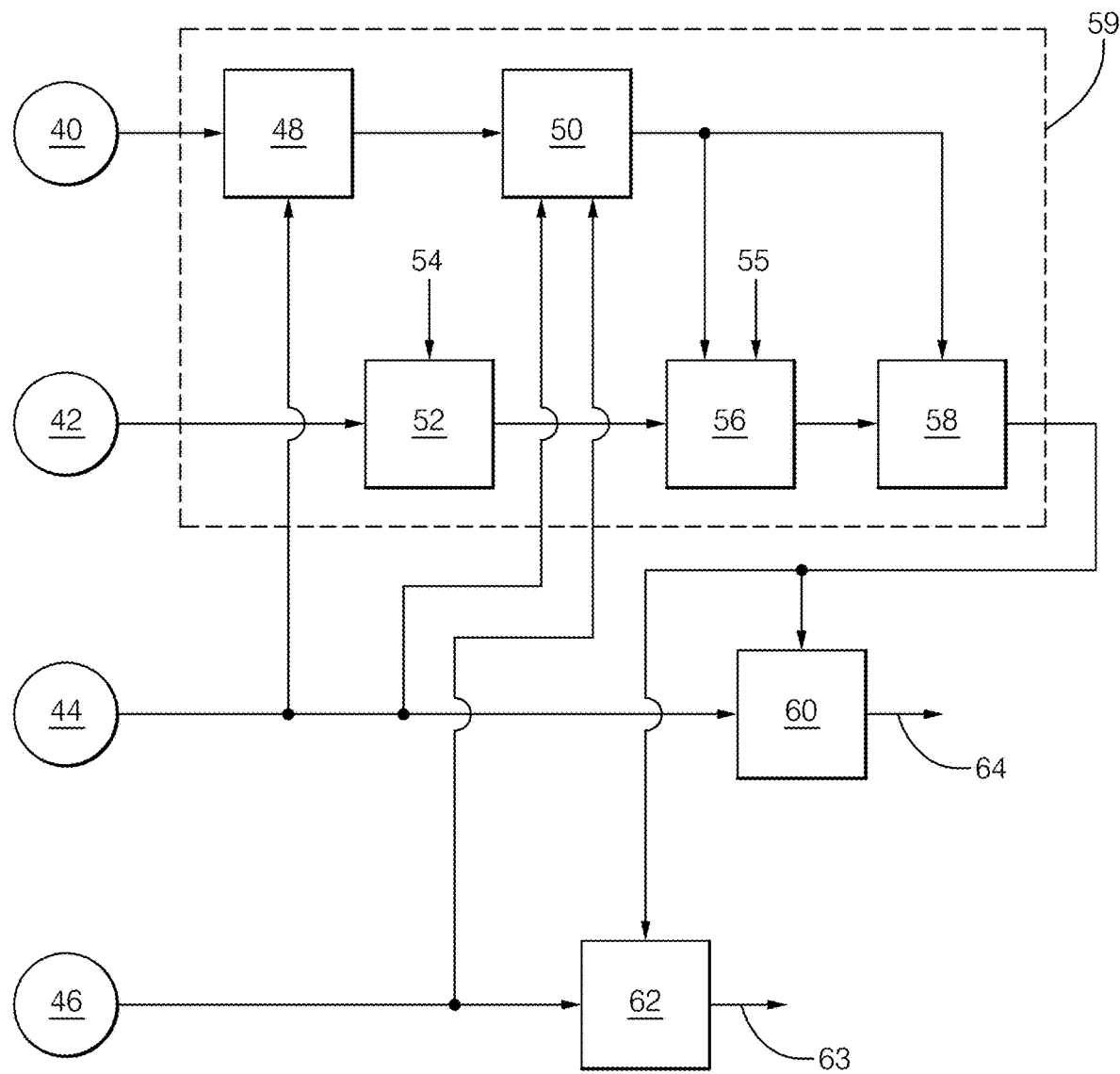
FIG. 3 a block diagram of a method for determining position and motion data of a vehicle equipped with a sensor.

A method for determining position and motion data of a vehicle is described with respect to FIG. 3. The method starts with data sources 40, 42, 44, and 46. Source 40 represents a database in which predefined map data, in particular high-definition (HD) map data, is stored. Source 42 represents sensor data samples, which are determined by using a radar sensor of the vehicle, for example sensor 12 from FIGS. 1 and 2. The sensor data samples are determined in at least one scan of the vehicle's vicinity, wherein the scan comprises the sensor data samples given in the sensor data representation, as discussed in connection with FIG. 1. Source 44 represents preliminary position data of the vehicle, for example in the form of a set of Cartesian coordinates and an orientation angle of the vehicle (vehicle pose). Source 46 represents preliminary motion data of the vehicle, for example vehicle motion parameters velocity v and yaw rate @, wherein motion sensors of the vehicle are used for determining the motion data, as discussed in connection with FIG. 2. The vehicle motion parameters are processed by a motion model of the vehicle in order to obtain the preliminary position data 44. Alternatively, another localization system (e.g., DGPS) of the vehicle can be used. The motion model or another localization system is used to determine the preliminary position data 44 of the vehicle, which is assumed to be inaccurate with respect to the true position of the vehicle. In order to obtain a more precise or final position of the vehicle the following steps are carried out. The same holds for the preliminary motion data 46, which is assumed to be inaccurate, for example due to the limited accuracy of the motion sensors used for obtaining the preliminary motion data 46. A more precise estimate of the true motion data is desired.

In block 48, a predefined map comprising a plurality of elements is determined from the database 40 in dependence of the preliminary position data 44, wherein each of the elements represents a static landmark in the vicinity of the vehicle at the preliminary position, for example the poles 18 in the vicinity 16 of the vehicle 10, as shown in FIG. 1. The elements are given in a map data representation, as discussed in view of FIG. 1 and FIG. 2.

The predefined map from block 48, the position data 44, and the motion data 46 form input for block 50, which represents a method step of transforming the elements of the map into the sensor data representation, as discussed in connection with FIG. 2. The transformed elements can be considered to represent a simulated map because the elements are transformed into virtual sensor data samples. The preliminary position data 44 and the preliminary motion data 46 is used as input for block 50. The method steps of blocks 56 and 58 are carried out on the basis of the transformed elements from block 50 and the (detected) sensor data samples 42.

In block 52, a signal strength indicator for each of the sensor data samples 42 is compared with a threshold 54, which may be denoted as an influence parameter for controlling the influence of the sensor data samples 42 on the matching. If the signal strength indicator for a given sensor data sample is below the threshold 54 the given sensor data sample is discarded. In other words, only the sensor data samples with a signal strength indicator above the threshold form the input for the subsequent block 56. This can be regarded as signal-to-noise filtering.

In block 56, the most similar sensor data sample from block 52 is identified for each of the transformed elements from block 50. This may be done by identifying candidate sensor data samples from the output of block 52, wherein the candidate sensor data samples are located within a neighborhood of a given transformed element. The candidate sensor data sample having a minimum difference to the transformed element is selected as the most similar sensor data sample and assigned to the transformed element. The neighborhood of a given transformed element is defined by thresholds for each of the first and second component of the sensor data representation. For example, when a respective element has component values (de, ve) the neighborhood can be defined by intervals [de−d1, de+d1] for the first component and [ve−v1, ve+v1] for the second component. It is understood that the limits of these intervals define thresholds.

The thresholds are not fixed. They are determined in dependence of the preliminary motion data 46, namely velocity and yaw rate, which may be denoted as influence parameters 55 for controlling the influence of the sensor data samples 42 on the matching. This is explained in more detail with respect to FIG. 4.

The sensor velocity 24 is determined on the basis of the velocity and the yaw rate of the vehicle, cf. FIG. 1. It is understood from FIG. 1 that similar angles for the radial direction between the pole 18 and the sensor 12 on the one hand, and the sensor-velocity vector 24 on the other hand mean that the radial velocity 28 and the inverse sensor velocity 26 are also similar. Thus, the radial velocity 28 ("Doppler) depends on the angle between the radial direction and the sensor velocity 24. This is illustrated in diagram 100, cf. FIG. 4, wherein graph 102 represents the radial velocity 28 ("D" axis in diagram 100) in dependence of the angle θ for a fixed velocity of the vehicle and a fixed pole 18 in the vicinity of the vehicle. It can be seen that the graph 102 has a maximum at an angle $θ_v$, which means that the sensor velocity 24 and the radial distance 30 have the same angle θ with respect to the sensor coordinate axis 20, cf. FIG. 1. In other words, the sensor 12 is moving directly towards or away from the respective pole 18. However, if the sensor 12 moves in a more different direction with respect to the pole 18, the radial velocity 28 is smaller. It can also be seen that the rate of change of the radial velocity 28 increases the more the directions of the sensor velocity 24 and the direction of the pole (radial distance) diverge. This means that the change of the radial velocity 28 increases with angles further away from the angle $θ_v$.

Figure 4:
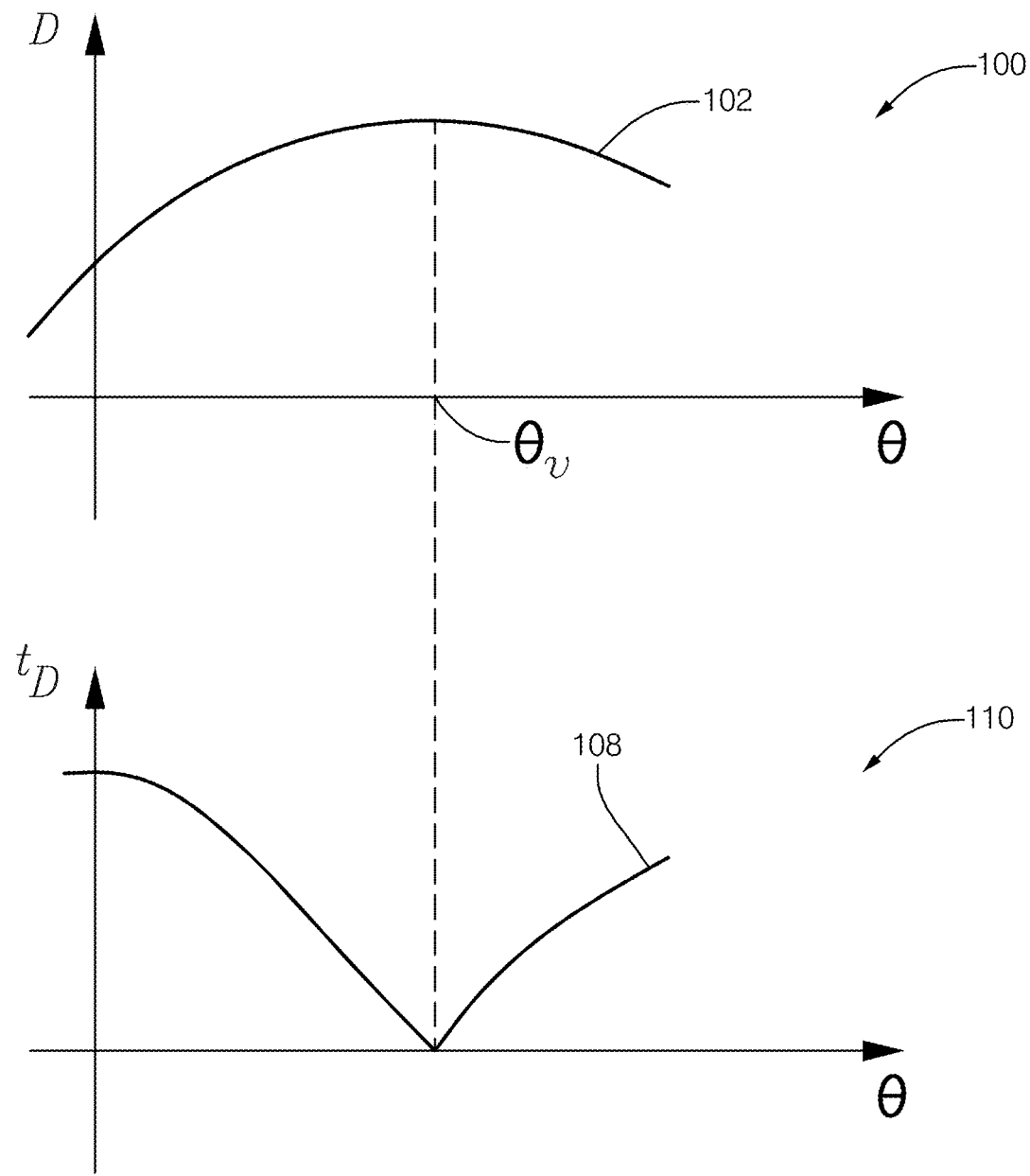
FIG. 4 diagrams for illustrating an adaptive threshold for identifying sensor data samples for matching.

A threshold $t_D$ is determined on the basis of the radial velocity 28, as illustrated in diagram 110, cf. FIG. 4. Graph 108 shows that a minimum threshold is foreseen when the radial velocity D is maximum. This is where the change of the radial velocity 28 is relatively low in this range (low change of the radial velocity 28). Larger thresholds are used for decreasing values of the radial velocity 28. In more general terms, the neighborhood becomes larger with increasing angle relative to the angle $θ_v$. A predefined rule can be used to determine the threshold, e.g. for each transformed element of the map with an assigned sensor data sample. This can be done in order to obtain for example the characteristic of graph 108. In this way, one or more thresholds can be determined in an adaptive manner, wherein the vehicle motion affects the transformed elements and their neighborhood for identifying candidate sensor data samples. For example, one or more thresholds can be used for the second component. For the first component, one or more fixed thresholds can be sufficient. The adaptive thresholds ensure reliable identification and assignment of sensor data samples, which are used for the matching. It is understood that the velocity and the yaw rate of the vehicle form influence parameters 55 for controlling the influence of sensor data samples on the matching. The preliminary motion data 46 can be used for this purpose.

As already noted above, in block 56, the most similar sensor data sample from block 44 is assigned to the respective transformed element from block 50. This means that pairs of transformed elements and assigned sensor data samples are determined. As a measure of similarity the Euclidean distance is determined between each of the candidate sensor data samples and one of the transformed elements. This is done in the sensor data representation, i.e. the distance is determined with respect to the first and second component.

The steps of block 56 are carried out for each of the transformed elements from block 50. As the case may be, no candidate sensor data samples are found for a respective element. These elements are not considered further for subsequent processing steps. It is understood that the sensor data samples, which have been assigned to a respective element in block 56, form a subset of all sensor data samples from block 52.

In block 58, a rigid transformation function is determined by minimizing a cost function that describes the mismatch, for example the sum of the squared differences, between the transformed elements from block 50 and the assigned sensor data samples. The cost function involves transforming the transformed elements from block 50 by means of the rigid transformation function, wherein the rigid transformation function is subject to a set transformation parameters, which are optimization parameters. Five parameters can be used, namely x-coordinate position of the vehicle, y-coordinate position of the vehicle, orientation angle of the vehicle, velocity of the vehicle, and yaw rate of the vehicle. An optimum set of transformation parameters is found, which minimizes the mismatch between the transformed elements of the predefined map and the assigned sensor data samples. Optimization algorithms, which are generally known in the art, can be used to determine the optimum parameter set.

Having further regard to block 58, the assigned sensor data samples are weighted with a weighting parameter, which is another influence parameter for controlling the influence of sensor data samples on the matching. It is preferred that the sensor data samples are weighted with their inverse squared distance component (first component of the sensor data representation). This reduces the influence of sensor data samples with large distance components. These data samples are considered to be more noisy. As a result, the result of the matching is more accurate.

In block 60, the preliminary position data 44 is transformed (i.e. corrected) by means of some of the optimum transformation parameters, namely x-coordinate translation, y-coordinate translation, and orientation change (rotation). The resulting final position data 64 of the vehicle is considered to be more accurate than the preliminary position data 44. Likewise, in block 62, the preliminary motion data 46 is transformed by means of some of the transformation parameters 58, namely offsets for velocity and yaw rate. The resulting final motion data 63 of the vehicle is considered to be more accurate than the preliminary motion data 46.

In case a plurality of sensors mounted at the same vehicle is used, the method described in view of FIG. 3 can be extended. A loop can be implemented, wherein the method steps inside the dashed block 59 is carried out for each of the plurality of sensors. The determination of the rigid transformation function in block 58 takes into account the mismatch between the transformed elements for each of the sensors and the corresponding assigned sensor data samples. Alternatively a Kalman filter can be employed. In this way, the parameters of the rigid transformation function can be considered to be even more accurate so that the accuracy of the determined position data 64 can be further increased in the sense of fusing the data of the plurality of sensors. As an alternative to a plurality of sensors, a single sensor can be used if reduced hardware costs are desired.

Figure 5:
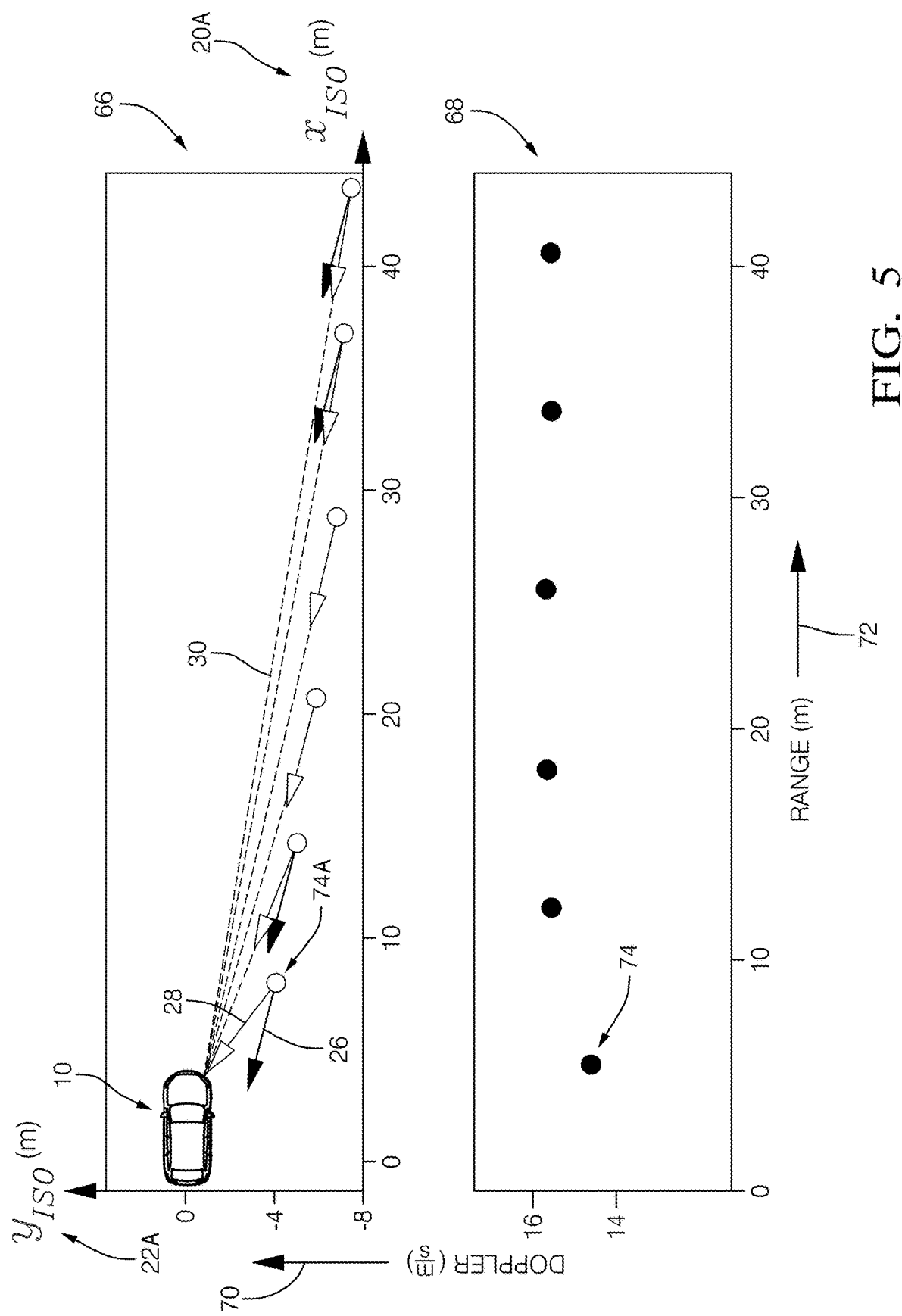
FIG. 5 diagrams for illustrating sensor data samples in a map data representation and a sensor data representation.
Figure 6:
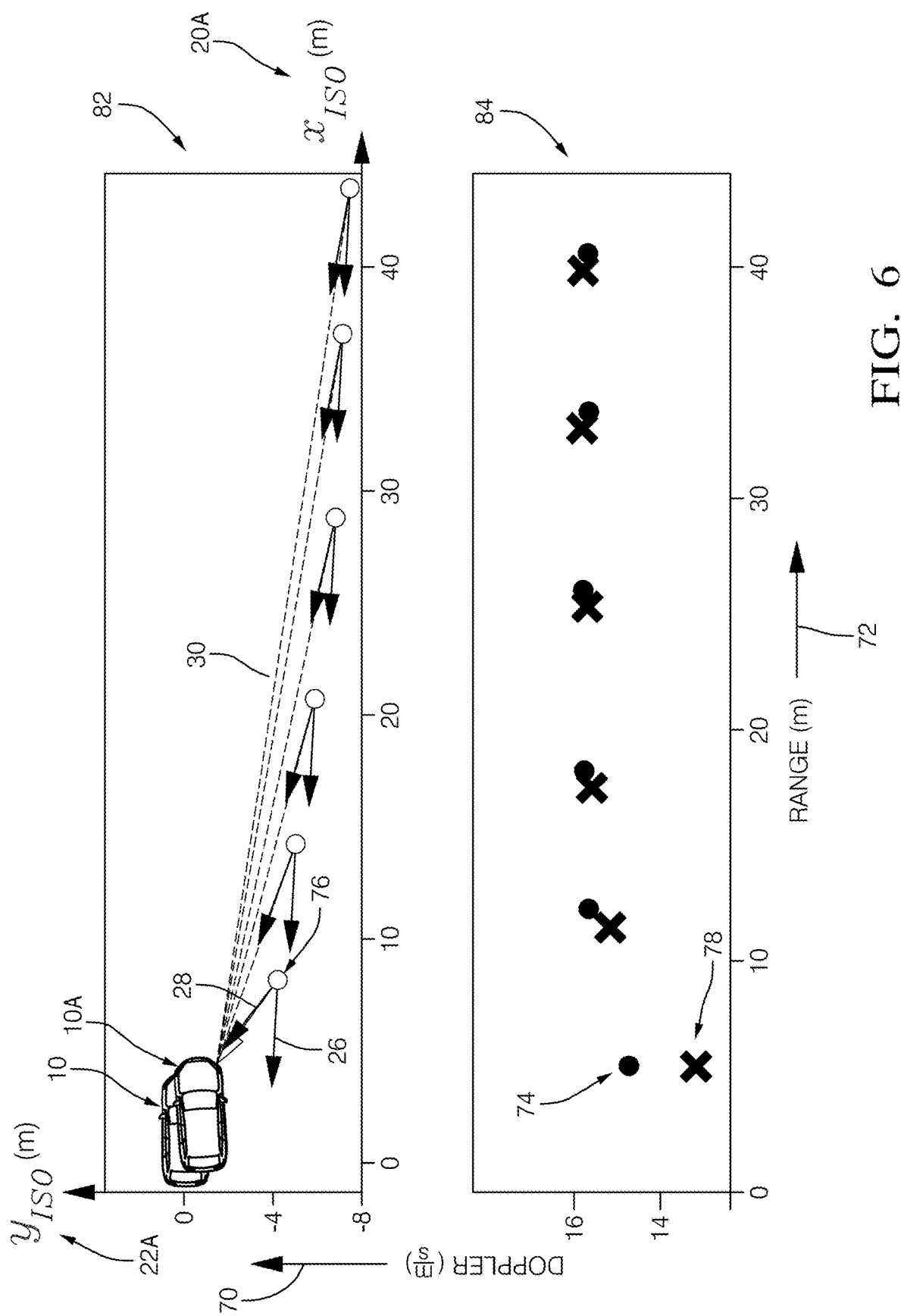
FIG. 6 the diagrams from FIG. 5 in an overlay with diagrams for illustrating elements of a predefined map.
Figure 7:
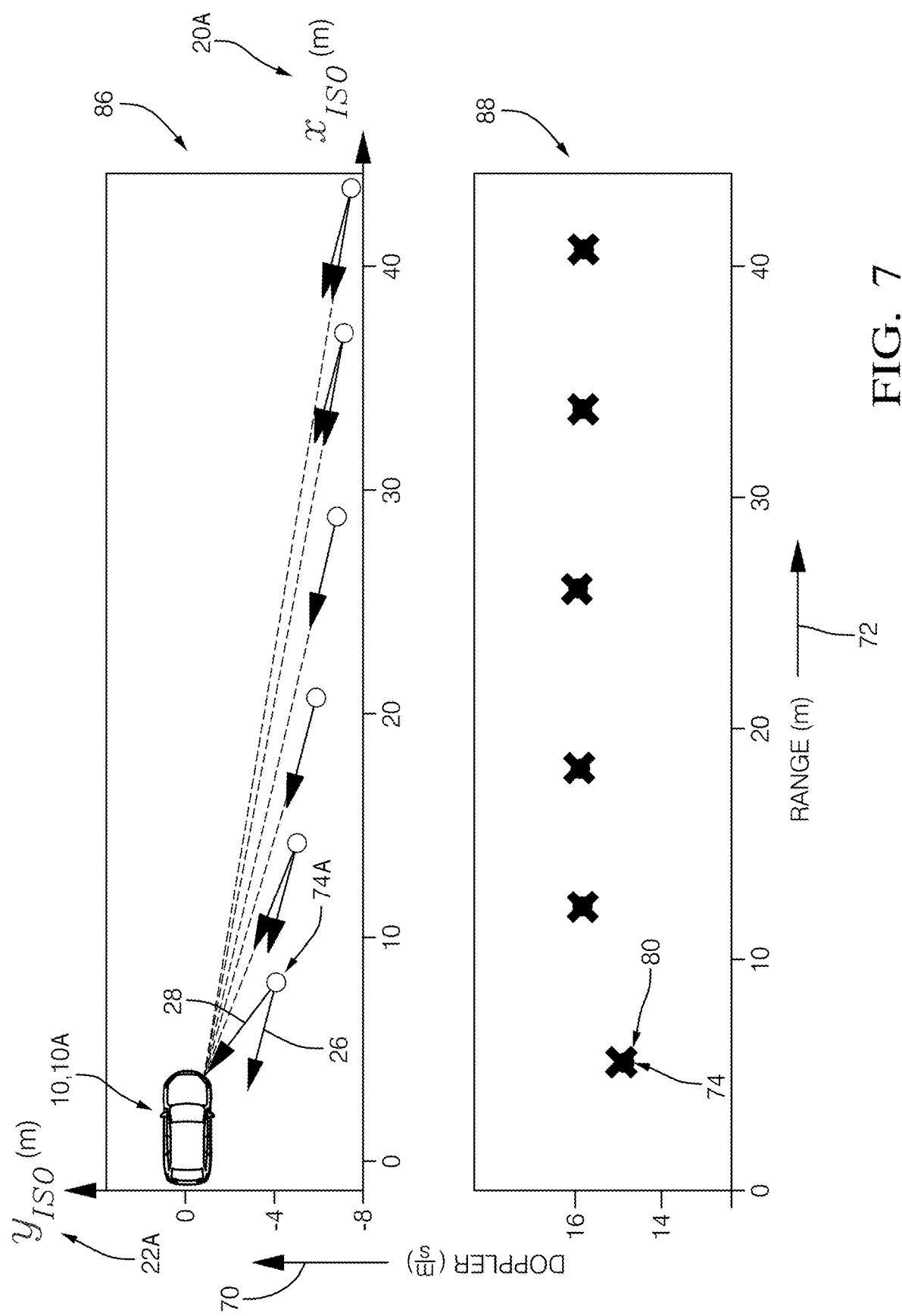
FIG. 7 the diagrams from FIG. 6, wherein the elements of the predefined map are matched to the sensor data samples.

The principle of the methods for determining the position data 64 is illustrated further with respect to FIGS. 5, 6, and 7. FIG. 5 comprises two diagrams 66 and 68. Diagram 68 comprises a plurality of sensor data samples 74 given in the sensor data representation, which comprises a first component, namely a distance velocity component 70 (Doppler), and a second component, namely distance component 72. It is understood that the component 72 represents a radial distance 30 illustrated in FIG. 1. Likewise, component 70 represents a radial velocity 28 as also shown in FIG. 1. The sensor data samples 74 represent the poles 18 from FIG. 1 as perceived by the sensor 12, wherein for further illustration corresponding sensor data samples 74A are shown in the map data representation in diagram 66 in FIG. 5. For illustrating purposes vehicle 10 is also shown in diagram 66. The units shown in the diagram 66 and 68 (m=meter, s=second) and also in the further diagrams to be discussed are merely exemplary and other units or ranges are possible. The x-coordinate dimension 20A and the y-coordinate dimension 22A of diagram 66 correspond to the dimensions shown in FIG. 2 with respect to the vehicle 10.

FIG. 6 comprises diagrams 82 and 84, which generally correspond to diagrams 66 and 68 from FIG. 5, respectively. However, diagram 84 comprises transformed elements 78, which represent the poles 18 as elements from the predefined map in the sensor data representation. The untransformed elements 76 are plotted in diagram 82, i.e. with respect to the dimensions 20A and 22A, wherein inverse velocity vectors 26 and radial velocity vectors 28 are shown for illustrative purposes. As can also be seen in diagram 82 a vehicle 10A is shown in overlay with the vehicle 10 from FIG. 5, wherein the position of vehicle 10A corresponds to the inaccurate position 44 discussed in connection with FIG. 3. As can be seen from diagram 84 a mismatch between vehicle 10 and the vehicle 10A corresponds to the mismatch of the sensor data samples 74 and the transformed elements 78. It is noted that the point-like nature of the sensor data samples 74 in FIG. 6 does not necessarily correspond to the true shape of the sensor data. In particular, the sensor data sample 74 can be blurred or spread along one or both of the components 70 and 72. Additionally, a plurality of sensor data samples 74 can be located around each of the transformed elements 78, which are indicated as crosses in diagram 84 of FIG. 6. However, diagram 84 shows a situation, wherein the most similar sensor data sample 74 has already been assigned to the nearest elements 78, which corresponds to the outcome of block 56 in FIG. 3. The rigid transformation function is then determined by minimizing a difference or mismatch between the sensor data samples 74 and the transformed elements 78 with the optimum parameter set 58 for the rigid transformation function.

The result of the matching is further understood when considering FIG. 7, which shows diagrams 86 and 88 that generally correspond to diagrams 82 and 84 from FIG. 6 after the matching, respectively. This is to say that the elements 78 from diagram 84 are transformed with the optimum parameter set by means of the rigid transformation function, which corresponds to block 58 in FIG. 3. As a result, there is no mismatch anymore between the sensor data samples 74 and the matched elements 80. Having regard to diagram 86, it can be seen that there is no mismatch between vehicles 10 and 10A. This means that the position of vehicle 10A, which corresponds to the inaccurate position data 44, has been transformed with the optimum parameter set by means of the rigid transformation function (block 60 in FIG. 3).

The processing effort required for carrying out the described method is much lower than with conventional methods, which involve transforming the sensor data samples 74 provided by the sensor 12 into a full spatial representation, for example with respect to the x-coordinate dimension 20A and the y-coordinate dimension 22A including angle information. This is because huge amounts of data samples need to be processed in order to extract detection points. In contrast, the number of elements 76 of the predefined map is much lower and therefore the processing effort for transforming these elements from the map data representation into the sensor data representation is much lower. Additionally, the use of the influence parameters ensures a robust result even when processing conditions are not optimum, e.g., due to high dynamic motion of the vehicle.

What is claimed is:

1. A computer-implemented method for determining at least one of position data or motion data of a vehicle, wherein the computer-implemented method comprises:
    capturing at least one scan from a radar or LiDAR sensor, the radar or LiDAR sensor having a single antenna such that a plurality of sensor data samples reflected by at least one object in a vicinity of the vehicle are in a single-dimensional spatial sensor data representation having two components, wherein the two components comprising the single-dimensional spatial sensor data representation being range and Doppler, respectively, the range representing a distance between the radar or LiDAR sensor and the at least one object, and the Doppler representing a rate of change of a radial distance between the radar or LiDAR sensor and the at least one object over time;
    determining, from a database, a predefined map, wherein the predefined map represents the vicinity of the vehicle and comprises at least one element representing a static landmark, wherein the at least one element is in a multi-dimensional spatial map data representation comprising a plurality of coordinates, wherein the plurality of coordinates represent position information of the static landmark;
    determining a transformed map by transforming the at least one element of the predefined map from the multi-dimensional spatial map data representation into the single-dimensional spatial sensor data representation resulting in each element of the at least one element of the predefined map being represented on the transformed map by a corresponding range and a corresponding Doppler;
    matching at least a subset of the at least one object to the at least one element of the transformed map based on respective ranges and respective Dopplers, wherein the matching is carried out in dependence on at least one influence parameter for controlling an influence of the plurality of sensor data samples on the matching; and
    determining the at least one of the position data or the motion data of the vehicle based on the matching.

2. The computer-implemented method of claim 1, wherein the at least one influence parameter comprises at least a first influence parameter representing motion of the vehicle.

3. The computer-implemented method of claim 1, wherein the at least one influence parameter comprises at least one of a first motion parameter of the vehicle or a second motion parameter of the vehicle, wherein the first motion parameter represents a velocity of the vehicle and the second motion parameter represents a yaw rate of the vehicle.

4. The computer-implemented method of claim 1, wherein the influence of the at least one object on the matching is controlled by determining the subset of the at least one object for matching in dependence of the at least one influence parameter.

5. The computer-implemented method of claim 1, the method further comprising:
    determining the subset of the at least one object for the matching by:
        identifying, from the plurality of sensor data samples, a first object by using an identification rule, wherein identifying the first object is carried out in dependence of the influence parameter; and
        assigning the first object to the at least one element of the transformed map.

6. The computer-implemented method of claim 5, wherein identifying the first object comprises:
- determining one or more candidate objects from the at least one object, wherein each of the candidate objects is located in a neighborhood of the at least one element of the transformed map, the neighborhood being defined with respect to the range and the Doppler of the single-dimensional sensor data representation, wherein the size of the neighborhood is defined in dependence of the influence parameter;
- determining, for each candidate object, a difference between the candidate object and the at least one element of the transformed map; and
- selecting, from the candidate objects, a respective candidate object as the first object, the respective candidate object satisfying a selection criterion based on the difference between the respective candidate object and the at least one element of the transformed map.

7. The computer-implemented method of claim 5, wherein the matching comprises:
- determining a rigid transformation function by minimizing a difference between the at least one element of the transformed map and the first object, wherein one of the at least one element and the first object is transformed based on the rigid transformation function.

8. The computer-implemented method of claim 7, wherein the rigid transformation function is determined in dependence on at least one parameter representing motion of the vehicle.

9. The computer-implemented method of claim 1, wherein the at least one influence parameter comprises a second influence parameter based on the range.

10. The computer-implemented method of claim 9, wherein the influence of the sensor data samples on the matching is controlled by weighting sensor data samples with the second influence parameter.

11. The computer-implemented method of claim 1, wherein the at least one influence parameter comprises a third influence parameter based on a signal strength indicator for the plurality of sensor data samples.

12. The computer-implemented method of claim 11, wherein the influence of the at least one object on the matching is controlled by excluding objects from the matching based on the third influence parameter.

13. A system configured to determine at least one of position data or motion data of a vehicle, the system comprising:
- a sensor system configured to receive electromagnetic radiation emitted from at least one emitter of the sensor system and reflected by at least one object in a vicinity of the vehicle towards the sensor system, the sensor system comprising a radar or a LiDAR sensor; and
- one or more processors configured to:
  - capture, by the sensor system, at least one scan, the radar or LiDAR sensor having a single antenna such that a plurality of sensor data samples reflected by the at least one object in the vicinity of the vehicle are in a single-dimensional spatial sensor data representation having two components, wherein the two components comprising the single-dimensional spatial sensor data representation being a range and a Doppler, respectively, the range representing a distance and the Doppler representing a rate of change of a radial distance between the sensor system and the at least one object over time;
  - determine, from a database, a predefined map, wherein the predefined map represents the vicinity of the vehicle and comprises at least one element representing a static landmark, wherein the at least one element is in a multi-dimensional spatial map data representation comprising a plurality of coordinates, wherein the plurality of coordinates represent position information of the static landmark;
  - determine a transformed map by transforming the at least one element of the predefined map from the multi-dimensional spatial map data representation into the single-dimensional spatial sensor data representation resulting in each element of the at least one element of the predefined map being represented on the transformed map by a corresponding range and a corresponding Doppler;
  - match at least a subset of the at least one object to the at least one element of the transformed map based on respective ranges and respective Dopplers, wherein the matching is carried out in dependence on at least one influence parameter for controlling an influence of the plurality of sensor data samples on the matching; and
  - determine the at least one of the position data or the motion data of the vehicle based on the match.

14. The system of claim 13, wherein the at least one influence parameter comprises at least a first influence parameter representing motion of the vehicle.

15. The system of claim 13, wherein the at least one influence parameter comprises at least one of a first motion parameter of the vehicle or a second motion parameter of the vehicle, wherein the first motion parameter represents a velocity of the vehicle and the second motion parameter represents a yaw rate of the vehicle.

16. The system of claim 13, wherein the influence of the at least one object on the matching is controlled by determining the subset of the at least one object for matching in dependence of the at least one influence parameter.

17. The system of claim 13, wherein the one or more processors are further configured to:
- determine the subset of the at least one object for the matching by being further configured to:
  - identify, from the plurality of sensor data samples, a first object by using an identification rule, wherein identifying the first object is carried out in dependence of the influence parameter; and
  - assign the first object to the at least one element of the transformed map.

18. The system of claim 17, wherein the one or more processors, in identifying the first object, are configured to:
- determine one or more candidate objects from the at least one object, wherein each of the candidate objects is located in a neighborhood of the at least one element of the transformed map, the neighborhood being defined with respect to the range and the Doppler of the single-dimensional spatial sensor data representation, wherein the size of the neighborhood is defined in dependence of the influence parameter;
- determine, for each candidate object, a difference between the candidate object and the at least one element of the transformed map; and
- select, from the candidate objects, a respective candidate object as the first object, the respective candidate object satisfying a selection criterion based on the difference between the respective candidate object and the at least one element of the transformed map.

19. The system of claim 17, wherein the one or more processors, in matching at least the subset of the at least one object to the at least one element of the transformed map, are configured to:

determine a rigid transformation function by minimizing a difference between the at least one element of the transformed map and the first object, wherein one of the at least one element and the first object is transformed by means of the rigid transformation function.

20. A non-transitory computer readable medium comprising computer-executable instructions that, when executed, cause a processor to:

capture at least one scan from a radar or LiDAR sensor, the radar or LiDAR sensor having a single antenna such that a plurality of sensor data samples reflected by at least one object in a vicinity of a vehicle are in a single-dimensional data representation having two components, wherein the two components comprising the single-dimensional spatial sensor data representation being a range and a Doppler, respectively, the range representing a distance between the radar or LiDAR sensor and the at least one object, and the Doppler representing a rate of change of a radial distance between the radar or LiDAR sensor and the at least one object over time;

determine, from a database, a predefined map, wherein the predefined map represents the vicinity of the vehicle and comprises at least one element representing a static landmark, wherein the at least one element is in a multi-dimensional spatial map data representation comprising a plurality of coordinates, wherein the plurality of coordinates represent position information of the static landmark;

determine a transformed map by transforming the at least one element of the predefined map from the multi-dimensional spatial map data representation into the single-dimensional spatial sensor data representation resulting in each element of the at least one element of the predefined map being represented on the transformed map by a corresponding range and a corresponding Doppler for each of the at least one element of the predefined map;

match at least a subset of the at least one object to the at least one element of the transformed map based on respective ranges and respective Dopplers, wherein the matching is carried out in dependence on at least one influence parameter for controlling an influence of the plurality of sensor data samples on the matching; and determine at least one of position data or motion data of the vehicle based on the match.

21. The computer-implemented method of claim 1, wherein the matching matches the subset of the at least one object to the at least one element of the transformed map by, determining the subset of the at least one object based on at least one influence parameter, matching the at least one element of the transformed map to corresponding ones of the subset of the at least one object based on respective ranges and respective Dopplers, determining a rigid transformation function that reduces a difference between the at least one element of the transformed map and the corresponding ones of the subset of the at least one object, and applying the rigid transformation function to one of the at least one element and the corresponding ones of the subset of the at least one object to correct the corresponding range and the corresponding Doppler thereof to generate a corrected transformed map from the transformed map; and wherein the determining determines the at least one of the position data or the motion data of the vehicle based on the corrected transformed map.

\* \* \* \* \*

UNITED STATES PATENT AND TRADEMARK OFFICE
CERTIFICATE OF CORRECTION

PATENT NO. : 12,005,907 B2
APPLICATION NO. : 17/141010
DATED : June 11, 2024
INVENTOR(S) : Ahmad Pishehvari et al.

Page 1 of 1

It is certified that error appears in the above-identified patent and that said Letters Patent is hereby corrected as shown below:

In the Claims

Column 19, Claim 13, Lines 62-63: after "distance", insert --between the sensor system and the at least one object,--

Column 21, Claim 20, Line 17: after "single-dimensional", insert --spatial sensor--

Signed and Sealed this
Eighth Day of April, 2025

Coke Morgan Stewart
*Acting Director of the United States Patent and Trademark Office*